(12) United States Patent
Arya et al.

(10) Patent No.: US 8,509,056 B1
(45) Date of Patent: Aug. 13, 2013

(54) MULTI-RING IP MULTICAST NETWORK AND METHOD USING AUTONOMOUS INSTANCES OF INTERIOR GATEWAY PROTOCOL (IGP)

(75) Inventors: Vishal Arya, Los Angeles, CA (US); Sunil A. Jethwani, Encino, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 492 days.

(21) Appl. No.: 12/779,871

(22) Filed: May 13, 2010

(51) Int. Cl.
*G01R 31/08* (2006.01)

(52) U.S. Cl.
USPC .......................................................... 370/216

(58) Field of Classification Search
USPC ......... 370/203, 229–240, 241–253, 254–258, 370/298–306, 351–356, 395.2, 395.21, 395.3, 370/395.31, 395.32, 395.4, 395.41, 395.42, 370/395.43, 395.5, 395.52, 395.53, 395.54, 370/395.6, 420–429, 503–520, 357–395, 370/395.1, 395.61, 396–411
See application file for complete search history.

(56) References Cited

U.S. PATENT DOCUMENTS

| | | | | |
|---|---|---|---|---|
| 6,963,575 | B1 * | 11/2005 | Sistanizadeh et al. | 370/404 |
| 7,660,326 | B2 * | 2/2010 | Shachar et al. | 370/458 |
| 2003/0058790 | A1 * | 3/2003 | Nagamine | 370/222 |
| 2004/0057375 | A1 * | 3/2004 | Shiragaki et al. | 370/216 |
| 2008/0089335 | A1 * | 4/2008 | Li et al. | 370/392 |
| 2009/0201803 | A1 * | 8/2009 | Filsfils et al. | 370/222 |

\* cited by examiner

*Primary Examiner* — Jung-Jen Liu (57) ABSTRACT

A multi-ring IP multicast network is implemented with "N" instances of an Interior Gateway Protocol (IGP). Each IGP instance is autonomously configured on a different ring network to provide service separation between ring networks. Each IGP instance announces the one or more sources that are mapped on the associated ring network. Each source is announced in one and only one IGP instance so that the source is mapped on one and only one ring network. An "N+1" instance of the IGP is implemented on the core routers that are connected to receivers to merge and redistribute the "N" distinct instances of the IGP to the distribution and access routers between the core router and receiver. This effectively merges the N IGP instances at each node so that the multi-ring network appears as a virtual single-ring network with a single IGP instance allowing each of the receivers access to any source connected to the network.

21 Claims, 9 Drawing Sheets

```
R1#SHOW CONFIGURATION IGP
```
34 → IGP INSTANCE1 {
  INTERFACE BLUE RING;
  INTERFACE BLUE SOURCE1;
}

30 → IGP INSTANCE2 {
  INTERFACE RED RING;
  INTERFACE RED SOURCE;

}

32 → IGP INSTANCE 3 {
  INTERFACE GREEN RING;
}

```
R2#SHOW CONFIGURATION IGP
```
34 → IGP INSTANCE1 {
  INTERFACE BLUE RING;
  INTERFACE BLUE SOURCE2;
}

30 → IGP INSTANCE2 {
  INTERFACE RED RING;
}

32 → IGP INSTANCE 3 {
  INTERFACE GREEN RING;
  INTERFACE GREEN SOURCE;
}

```
R3#SHOW CONFIGURATION IGP
```
34 → IGP INSTANCE1 {
  INTERFACE BLUE RING;
}

30 → IGP INSTANCE2 {
  INTERFACE RED RING;
}

32 → IGP INSTANCE 3 {
  INTERFACE GREEN RING;
}

IGP INSTANCE MERGE {
36 → REDISTRIBUTE IGP INSTANCE1 SOURCES BLUE;
  REDISTRIBUTE IGP INSTANCE2 SOURCES RED;
  REDISTRIBUTE IGP INSTANCE3 SOURCES GREEN;

FIG.4

38 — R3# IGP TABLE

IGP: INSTANCE1

| DESTINATION | NEXT-HOP INTERFACE | NEXT-HOP |
|---|---|---|
| BLUE SOURCE 1 | BLUE RING | R1 |
| BLUE SOURCE 2 | BLUE RING | R2 |

— 44

IGP: INSTANCE2

| DESTINATION | NEXT-HOP INTERFACE | NEXT-HOP |
|---|---|---|
| RED SOURCE | RED RING | R1 |

— 40

IGP: INSTANCE3

| DESTINATION | NEXT-HOP INTERFACE | NEXT-HOP |
|---|---|---|
| GREEN SOURCE | GREEN RING | R2 |

— 42

IGP: MERGE

| DESTINATION | NEXT-HOP INTERFACE | NEXT-HOP |
|---|---|---|
| BLUE SOURCE 1 | BLUE RING | R1 |
| BLUE SOURCE 2 | BLUE RING | R2 |
| RED SOURCE | RED RING | R1 |
| GREEN SOURCE | GREEN RING | R2 |

MULTI-RING IP MULTICAST NETWORK AND METHOD USING AUTONOMOUS INSTANCES OF INTERIOR GATEWAY PROTOCOL (IGP)

BACKGROUND

1. Field of the Invention

This invention relates to communication and routing in a redundant network topology, and more particularly to a multi-ring network and method using autonomous instances of an interior gateway protocol (IGP).

2. Description of the Related Art

Internet protocol (IP) multicast is a technique for one-to-many communication over an IP infrastructure in a network. IP multicast scales to a larger receiver population by not requiring prior knowledge of who or how many receivers there are. Multicast uses network infrastructure efficiently by requiring the source to send a packet only once, even if that packet needs to be delivered to a large number of receivers. The nodes (routers) in the network take care of replicating the packet to reach multiple receivers only when necessary.

An IP multicast group address is used by sources and receivers to send and receive content. Sources use the group address as the IP destination address in their data packets. Receivers use this group address to inform the network that they are interested in receiving packets sent to that group. For example, if some content is associated with group address 239.1.1.1, the source will send data packets destined to 239.1.1.1. Intended receivers of that content will "join" the IP multicast group, informing the network that they are interested in receiving data packets sent to the group address 239.1.1.1. The protocol used by receivers to join a group is called the Internet Group Management Protocol (IGMP).

Once the receivers join a particular IP multicast group, an IP multicast distribution tree is constructed for that group. The protocol most widely used for this is Protocol Independent Multicast (PIM). It sets up multicast distribution trees such that data packets from senders to a multicast group reach all receivers that have joined the group. For example, all data packets sent to the group address 239.1.1.1 are received by receivers who joined group address 239.1.1.1. The multicast tree construction is initiated by network nodes which are close to the receivers, i.e. it is receiver driven. As PIM join requests traverse the nodes in the network back to the source, each node (router) adds to the construction of the distribution tree. At each node, the router determines the next best hop (node) to eventually reach the source. As a consequence, the path from the source to the destination receiver is the shortest path.

The network of routers implements an instance of an Interior Gateway Protocol (IGP) such as IS-IS to determine the next best hop (node) to reach the source destination. The IGP instance configures each router with any interfaces and sources that are directly connected to each router. The routers share information regarding which sources are directly connected to which routers. Each router then constructs an IGP Table that lists the next-hop interface and next hop for each source in the network. The routers share information regarding the topology of the network, so that the constructed path in the distribution tree from any source to any destination receiver is the shortest possible path. The network is set up if all of the routers are working properly. When a router receives an IGMP join from a receiver or a PIM join from another node, the router looks up the next hop (node) for the source destination and forwards the PIM join. At each node, a branch is added up the tree until reaching the root (i.e. the source destination).

Each host (and each application on the host) that wants to be a receiving member of a multicast group (i.e. receive data corresponding to a particular multicast address) must send an IGMP join request. Adjacent routers use a PIM join to forward the initial join request from node-to-node to the source. In multicast routing, the source address is used to determine data stream direction. The source of the multicast traffic is considered upstream. The router determines which downstream interfaces are destinations for this multicast group (the destination address), and sends the packet out through the appropriate interfaces. The term "reverse path forwarding" is used to describe this concept of routing packets away from the source, rather than towards the destination.

A "ring" network is a network topology in which each ring node connects to exactly two other ring nodes, forming a single continuous pathway for signals through each node—a ring. Data travels from node to node, with each node along the way handling every packet. Many ring networks add a "counter-rotating ring" to form a redundant topology. The routers connected at the nodes in the ring are referred to as "core routers". These routers will typically connect to the receivers and sources via one or more distribution and access routers. IGP exists throughout all of the core, access and distribution routers throughout the network. An IGP Table provides the next hop and the next hop interface, which is what each node uses in order to route a packet to a particular destination. The core router independently decides whether to use the clock wise or anti-clockwise ring to reach the node.

SUMMARY

The following summary provides a basic understanding of one or more embodiments of the invention. This summary is not intended to identify key or critical elements of the invention or to delineate the scope of the invention. Its sole purpose is to present some concepts from one or more embodiments of the invention in a simplified form as a prelude to the more detailed description and the defining claims that are presented later.

One or more embodiments of the present invention provide an IP multicast network having additional capacity for distribution of data via a redundant network topology (e.g., a multi-ring network). This is accomplished, for example, by utilizing an integer number "N" of autonomous IGP instances on a multi-ring network that announce one or more sources that are mapped on the respective ring networks. Service separation based on a deterministic distribution and mapping of the sources promotes utilization of the total network capacity and contains failures within a single ring. An additional IGP instance merges and redistributes the "N" IGP instances to intermediate routers (e.g. access or distribution) between the ring and a receiver. By merging the separate ring networks and IGP instances at a common point at the node, the multi-ring network appears to the receiver as a virtual single-ring network with a single instance of IGP, enabling the receiver to access any source connected to the network.

In one embodiment, wired or wireless communication channels (e.g. optical fibers, cable, telephone lines, satellite links, cellular links, etc.) connect geographically diverse nodes into "N" autonomous ring networks. Within each ring, each node connects to two other nodes, forming a single continuous path for data traffic. Core routers are connected at respective nodes to each of the "N" autonomous ring networks, and each core router may be connected to at least one source or one receiver. The sources and receivers may be directly connected to core routers, or, more typically, they may be connected through access and distribution routers to the core routers.

The routers are configured to implement IP multicasting for one source to multiple receiver communication over the "N" ring networks. IP multicast "join" requests (e.g. an IGMP join) from the receivers to an IP multicast group address facilitate construction of an IP multicast distribution tree for that group as each join request traverses the nodes in the network (e.g. as a PIM join) back to the source, according to IGP tables at each node. The source broadcasts data traffic that traverses the network according to the IP multicast distribution tree with the routers replicating the data traffic as needed to reach the requesting receivers.

In one or more embodiments, "N" instances of an Interior Gateway Protocol (IGP) are implemented by the core routers. Each IGP instance may be autonomously configured on a different ring network to provide service separation between ring networks. Each IGP instance announces the one or more sources that are mapped on the associated ring network. Each source is announced in one IGP instance so that the source is mapped on one (and typically only one) ring network. Each core router builds "N" IGP tables that each list the destination sources, fiber ring interface and the next hop on the fiber ring towards the designated source. Each core router also builds a comprehensive table that merges the "N" IGP tables.

An "N+1" instance of the IGP is implemented on the core routers that are connected to receivers, to merge and redistribute the "N" distinct instances of the IGP to the distribution and access routers between the core router and receiver. The distribution and access routers then build their IGP tables based on a single IGP instance (i.e., the merged "N+1" instance). This effectively merges the "N" IGP instances at each node so that the multi-ring network appears as a virtual single-ring network with a single IGP instance through which each of the receivers can access any source connected to the network. When a receiver initiates an IGMP join request the router looks up the next hop interface and next hop, and forwards the request as a PIM join. This repeats at each node to construct the IP multicast distribution tree. At nodes within the ring, the next hop interface specifies the particular ring network to which that source is mapped.

In one embodiment, the IP multicast ring network may be used to distribute video content from local collection facilities (sources) to satellite broadcast centers (receivers), e.g., to uplink video content to a satellite network for broadcast.

These and other features and advantages will be apparent to those skilled in the art from the following detailed description, taken together with the accompanying drawings.

DETAILED DESCRIPTION

In general, one or more embodiments of the present invention provide a redundant network (e.g., multiple ring networks with common nodes) using multiple autonomous instances of a communication protocol (e.g., the Interior Gateway Protocol (IGP)) to provide service separation between the constituent networks, and using another instance of the communication protocol to merge the autonomous instances under a virtual unified network interface. In this regard, one or more embodiments of the inventive methods and systems will be described herein, but it is to be understood that this description is not meant to limit the invention or the inventive subject matter. Although embodiments of the invention will be described for use in the context of a multicast media application in a multi-ring network, embodiments of the invention can be used for other communication applications in any redundant network architecture.

Sample Application of a Multicast Ring Network as a Media Backbone

IP multicast ring networks may be deployed, for example, for use as a backbone network for terrestrial distribution of video content and other data to satellite broadcast centers to uplink to satellite networks for television broadcast. For example, a satellite media distribution company may use a single 10 GB IP multicast ring network to distribute video in the western US and another single 10 GB IP multicast ring network to distribute video in the eastern US. In addition to video, transmitted data may include, for example, subscriber set top box callback data, network management and control traffic as well as data destined to the Internet. As the demand for IP multicast services increases, the capacity of the ring networks needs to increase.

One approach for improving capacity is to replace the existing fiber ring and equipment with a higher bandwidth network. However, it may not be cost effective to replace the fiber ring with one having appreciably greater capacity. Another possible approach is to install a second parallel fiber ring network on the existing infrastructure. For example, the addition of a 10 gigabyte (GB) network to an existing 10 GB network may double the current capacity. The addition of a 10 GB network to an existing 5 GB network would conceivably triple the current capacity.

Solely for ease and clarity of explanation, the ring networks, sources attached to the ring networks and IGP instances will be referenced below by colors (e.g. red, green and blue) associated with respective IGP instances in a multi-ring network. Apart from conceptually differentiating between IGP instances, the color designations are completely arbitrary, and do not constitute part of the invention.

Multi-Ring Network Embodiment with Single IGP Instance

Figure 1:
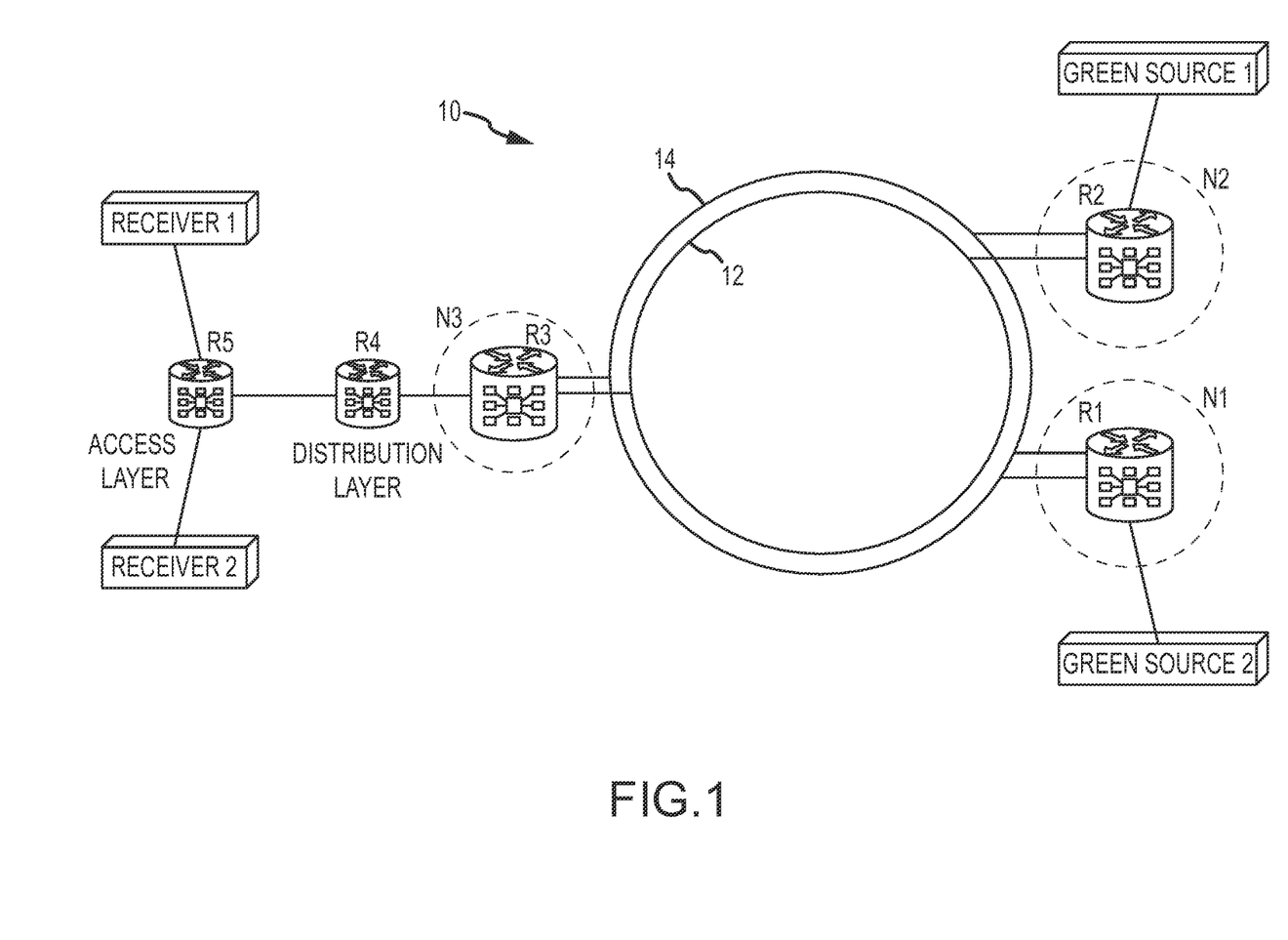
FIG. 1 is an illustration of a multi-ring network for IP multicast using a single instance of IGP.

An exemplary embodiment of a multi-ring network is shown in FIG. 1. As shown, an existing IP multicast ring network 10 may include a "green" fiber ring network 12 (green ring 1) that connects geographically diverse nodes N1, N2 and N3. Ring network 12 includes both a clockwise ring and a counterclockwise ring. Within each ring, each node connects to two other nodes, forming a single continuous path for data traffic. A plurality of core routers R1, R2 and R3 are connected at respective nodes N1, N2 and N3 to the ring network. Each router is connected to at least one source or one receiver. In this simplified example, router R1 is connected to Green Source 2, router R2 is connected to Green Source 1 and router R3 is connected through a distribution layer router R4 and an access layer router R5 to receiver 1 and receiver 2. In general, the network may connect many nodes with different sources and receivers connected to each node. The sources and receivers may be directly connected to the nodes or more typically may be connected through one or more access or distribution layer routers to the nodes. Sources may, for example, comprise encoders or multiplexers. Receivers may, for example, comprise decoders or multiplexers.

The routers are configured to implement IP multicasting for one source to multiple receiver communication over the network using a "green" instance of an interior gateway protocol (IGP). IGP announces all of the sources that are connected to the network. More particularly, at each router, the IGP instance announces the ring interface and any sources directly connected to the router. Each router builds an IGP table that lists all of the destination sources in the network, the fiber ring interface and the next hop (node) towards the destination source. IP multicast join requests (e.g. IGMP join) from the receivers to an IP multicast group address construct an IP multicast distribution tree for that group. As the join requests traverse the nodes (e.g. as PIM joins) in the network back to the source, each node (router) adds to the construction of the distribution tree. At each node, the router looks up the next best hop (node) from its IGP table to eventually reach the source. As a consequence, the path from the source to the destination receiver is typically the shortest or optimal path. The source broadcasts data traffic that traverses the network according to the IP multicast distribution tree, with the routers replicating the data traffic as needed to reach the requesting receivers that may branch off from nodes in the ring.

To increase capacity, a second green fiber ring 14 is installed on the existing infrastructure to connect the same geographically diverse nodes N1, N2 and N3. The second fiber ring may have less, the same or more bandwidth than the existing green fiber ring 12. Each router is connected to both fiber rings and its one or more sources or receivers. The instance of IGP announces all of its sources connected to both ring networks. Conceptually this should increase the effective capacity of the overall ring network.

Figure 2A:
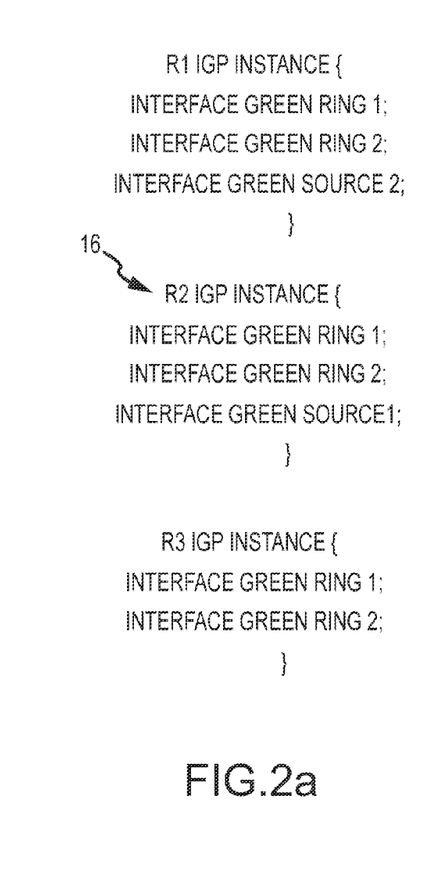
FIGS. 2a and 2b are pseudo code and an IGP table for the single instance of IGP on a multi-ring network.
Figure 2B:
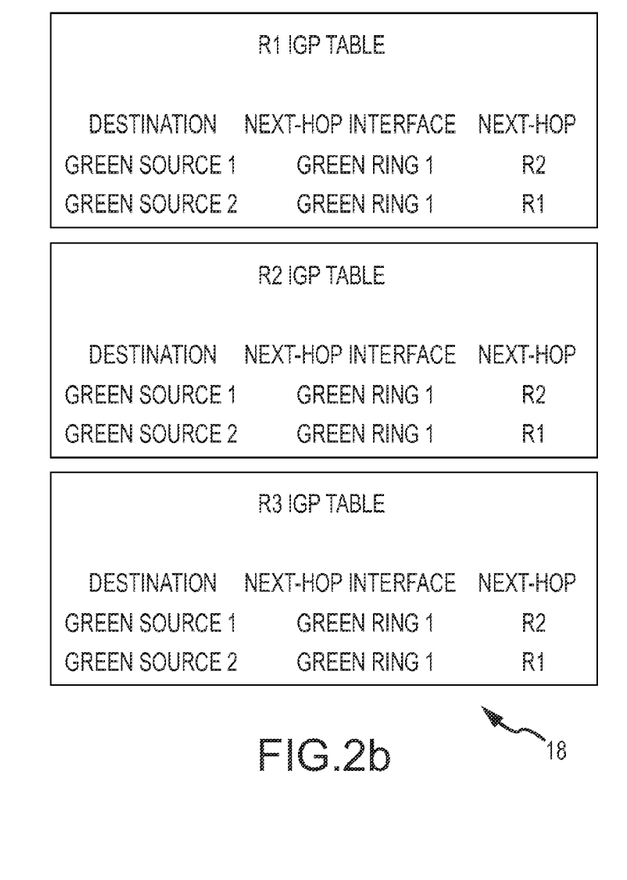

As previously described, the routers implementing the green IGP instance 16 on the network construct an IGP table 18 for each node that selects the next-hop interface (e.g. first fiber ring 12 or second fiber ring 14) and the next best hop (node) to the source destination as shown in FIGS. 2a and 2b. As a join request (or multiple join requests from different receivers for the same source) traverses the nodes according to the IGP tables, it builds the IP multicast distribution tree. In a dual-ring network, the IGP table specifies the next hop and also incorporates a selection of which ring network to traverse. Conceptually the different IGP tables at routers throughout the network will select different ring networks for different source destinations thereby utilizing the additional capacity provided by the addition of the second fiber ring 14 and provide a measure of load balancing.

However, in a network comprised of two (or more) green fiber ring networks, the single IGP instance has been found to produce unexpected and undesirable results. First, if one of the ring-networks should fail, the IGP instance automatically reconfigures the IGP tables to shift the traffic to the other ring-networks. This may appear to be a positive attribute; shifting traffic to avoid a failure thereby avoiding disruption. Upon closer consideration, however, the migration of traffic from one ring to the other may overload and/or oversubscribe the capacity of the second ring causing both to fail. If there are more than two rings, this can cause a cascade effect that causes all of the rings to fail. If, for example, the network traffic is primarily on-demand video data, service degradation or prioritizing traffic may not be an option. The second ring network may have been added to increase capacity for servicing demand that exceeds the capacity of either ring network individually.

Consider the case of a first ring network with a 5 GB capacity and a second ring network with a 10 GB capacity. In order to optimize a given path from a receiver to a source destination, each router will always choose the second ring network for each hop. This approach optimizes a given path but the overall impact on the network is undesirable. The 5 GB capacity of the first ring network is unused. If system designers allow for peak bandwidth utilization in excess of 10 GB, expecting 15 GB capacity, the network may fail. Now consider the case of first and second ring networks with identical 10 GB capacity. In building its IGP table, each router will randomly choose either the first or second ring network as they are equivalent. This may again appear to be a positive attribute; random selection between the networks should statistically load balance traffic and utilize the available capacity. Upon closer consideration however this approach does not ensure that the utilized or demanded capacity of each ring network at a given time is within the capacity of each network. For example, if the routers try to direct 12 GB traffic over one of the networks it may fail. Its failure may then route the 12 GB traffic to the other ring network causing it to also fail. As shown in FIG. 2a, for the simple 3-node network, IGP only selects green ring 1.

These problems can be traced to different aspects of IGP. First, IGP constructs an IGP table that creates the shortest path for each join request through the network. This is optimal from the perspective of a given request, but turns out to be suboptimal from the perspective of utilizing the available capacity of a multi-ring network. Second, IGP is unaware of actual utilized bandwidth. IGP cannot re-route traffic to suboptimal paths to better utilize the total capacity of the network or to avoid over-burdening a given ring network. These limitations pose an impediment to expanding the existing single-ring network to include additional rings to increase the network capacity, to avoid overutilization of a ring network and to contain failures within a single ring within the constraints posed by IP multicasting using IGP.

Multi-Ring Network Embodiment with Multiple IGP Instances

One embodiment of the present invention provides an IP multicast multi-ring network using IGP that effectively increases usable network capacity, avoids overutilization of a given ring network and contains failures within a single ring. This is accomplished by deterministically mapping the sources to specific ring networks, enforcing service separation between the ring networks, and merging the rings at the nodes so that the multi-ring network appears as a single ring network to receivers and external routers running a single IGP instance.

In accordance with one or more embodiments of the invention, "N" instances of an Interior Gateway Protocol (IGP) are implemented on the core routers in the multi-ring network (where "N" is an integer greater than one). Each IGP instance is autonomously configured on a different ring network to provide service separation between ring networks. Each IGP instance announces the one or more sources that are mapped on the associated ring network. In one embodiment, each source is announced in one and only one IGP instance so that the source is mapped on one and only one ring network. The sources are mapped in such a manner that the capacity of each ring network is utilized but not over utilized. The core routers share information regarding which sources are directly connected to each router on each of the ring networks. The shared source information is confined to each IGP instance and ring network. Each router then constructs an IGP table that lists the destination sources, fiber ring interface and the next hop on the fiber ring towards the designated source for each IGP instance and then suitably merges the tables into a single comprehensive IGP table. An additional (e.g., "N+1") instance of the IGP is implemented on the core routers that are connected to receivers, to merge and redistribute the "N" distinct instances of the IGP to distribution or access routers between the core router and the receiver, so that those routers can build their IGP table with a single IGP instance and each of the receivers can access any source connected to the network.

By keeping the "N" IGP instances separated, we control which ring networks service which sources, thereby achieving load balancing and utilization of the total network capacity, avoiding over utilization of any ring network and containing failures within a single ring. By providing an additional IGP instance that merges the "N" IGP instances, the autonomous multi-ring network appears as a virtual single-ring network to external routers running a single IGP instance so that each receiver can access any source on the network as if controlled by a single IGP instance.

Figure 3:
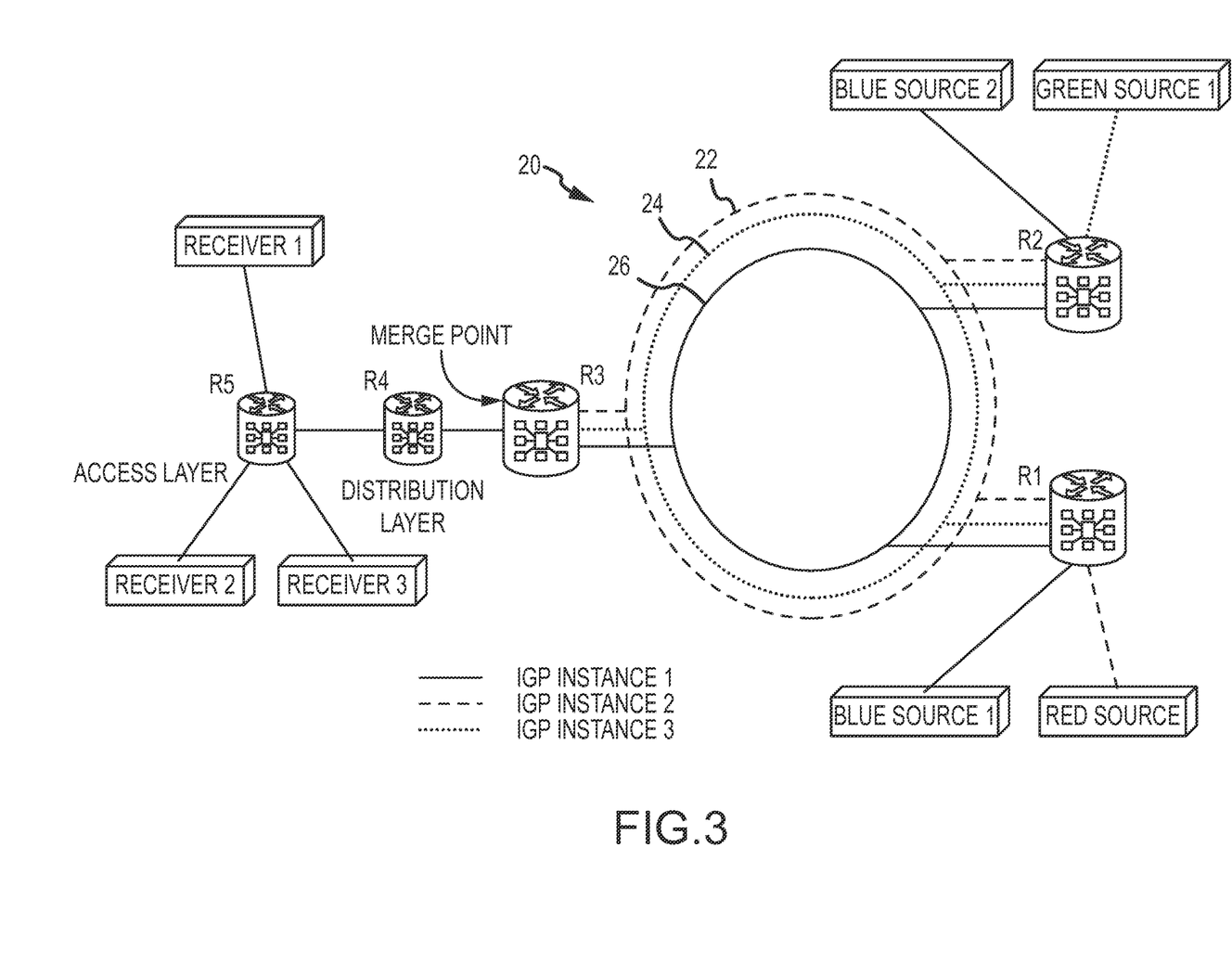
FIG. 3 is an illustration of a multi-ring network for IP multicast using autonomous instances of IGP, in accordance with one or more embodiments of the present invention.
Figure 4:
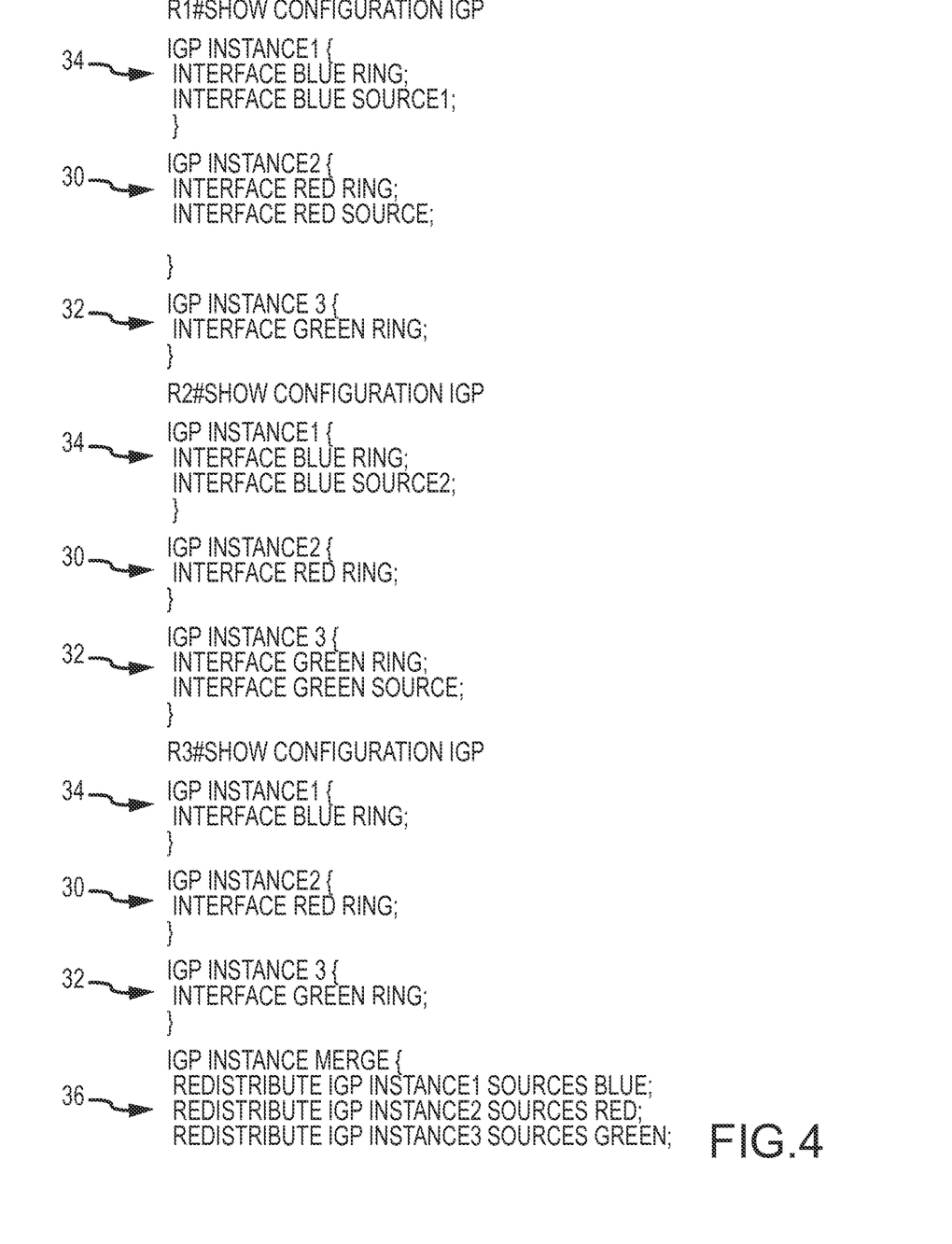
FIG. 4 is pseudo code for implementing an instance of IGP for each ring and merging the instances so that each receiver can access any source on the network, in accordance with one or more embodiments of the present invention.
Figure 5:
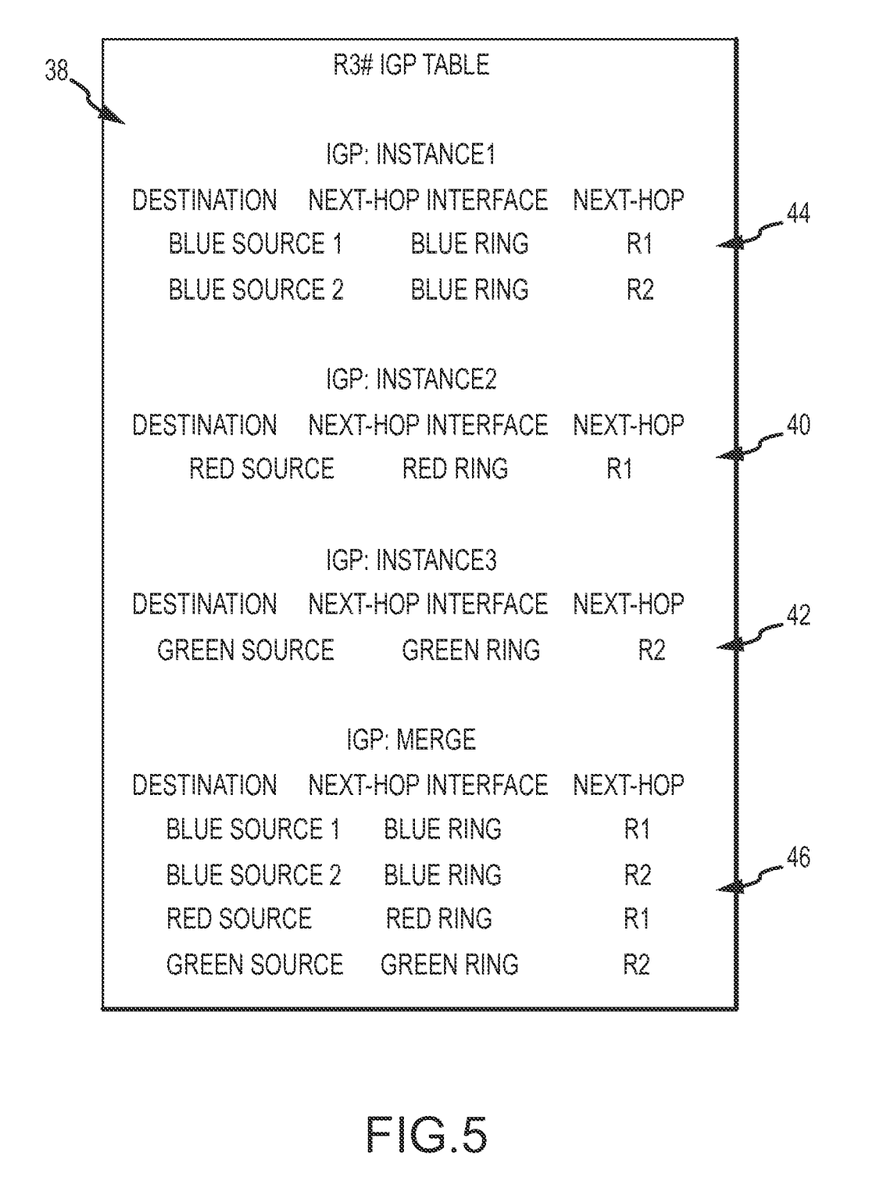
FIG. 5 is an IGP table for merging the IGP instances at a router, in accordance with one or more embodiments of the present invention.

An embodiment of a simple IP multicast three-ring network 20 is illustrated in FIGS. 3 through 5. Network 20 may include autonomous red, green and blue fiber ring networks 22, 24 and 26, respectively, that connect geographically diverse nodes N1, N2 and N3. Each ring network includes both a clockwise ring and a counterclockwise ring. Within each ring each node connects to two other nodes forming a single continuous path for data traffic. A plurality of core routers R1, R2 and R3 are connected at respective nodes N1, N2 and N3 to each of the ring networks. Each router is connected to at least one source or one receiver. In this simplified example, router R1 is connected to Blue Source 1 and Red Source, router R2 is connected to Green Source and Blue Source 2 and router R3 is connected through a distribution layer router R4 and an access layer router R5 to receiver 1, receiver 2 and receiver 3. In general, the network may connect many nodes with different sources and receivers connected to each node. The sources and receivers may be directly connected to the nodes or more typically may be connected through one or more access or distribution layer routers to the nodes.

Red, green and blue instances 30, 32 and 34, respectively, of an Interior Gateway Protocol (IGP) (e.g. red IGP instance 2, green IGP instance 3 and blue IGP instance 1) are implemented on the core routers R1, R2 and R3 in the multi-ring network as shown in FIG. 4. Each IGP instance is autonomously configured on a different ring network to provide service separation between ring networks (e.g. red IGP instance on red ring network and so forth). At each router R1, R2 and R3, each IGP instance announces the one or more sources that are mapped on the associated ring network and directly connected to the router, e.g. red sources announced in red instance of IGP on red ring network. In this embodiment, each source is announced in one and only one IGP instance so that the source is mapped on one and only one ring network. The sources are mapped in such a manner that the capacity of each ring network is utilized but not over utilized. The core routers share information regarding which sources are directly connected to each router on each of the ring networks. The shared source information is confined within each instance (e.g. red sources within the red instance and so forth). A fourth merge instance 36 (the "N+1" instance) of the IGP is implemented on core router R3 that is connected to receiver 1, receiver 2 and receiver 3 to merge and redistribute the red, green and blue instances of the IGP as a single IGP instance to distribution layer router R4 and access layer router R5.

In many networks, the nodes (core routers) will not be directly connected to the sources. As with the receivers, the sources may be connected to an access router and one or more access routers connected to a distribution router, which is directly connected to the node. In these cases, the sources will not be directly announced in the instances for the core routers but will be announced in the instances for the access routers and shared throughout the network for each of the autonomous IGP instances so that the sources are announced in the appropriate IGP instances on the ring network. The mapping of a particular source to a particular ring network (e.g. a red source to the red ring network) may be handled either with dedicated physical connections (e.g. red sources to red connections) between the access, distribution and core routers or with logical designations of the sources (e.g. a "red" source).

A few illustrative cases are described.

Case 1: Core Router→Access Router→Red Sources

In this case, a red instance is implemented on the access router that announces a red interface and each of the red sources. The "red interface" is the single physical connection between the access router and core router. The core router knows that all sources are "red" and are shared only with the red instances within the red ring.

Case 2: Core Router→Access Router→Red, Green and Blue Sources

In this case, red, green and blue instances are implemented on the access router that announces a red interface and each of the red sources, blue interface and each of the blue sources and a green interface and each of the green sources. The red, green and blue interfaces may either be separate red, green and blue physical connections between the access router and the core router or they may be logical interfaces on a single physical connection. Either through the direct physical connection or the logical designation the core router knows which sources to share with each of the colored ring networks.

Case 3: Core Router→Distribution Router→Access Router1→red sources, Access Router 2→green sources, Access Router3→blue sources In this case, each access router is implemented with a single colored instance and connected to the distribution router with a single physical connection that is identified as the corresponding color. The distribution router is implemented with red, green and blue instances that couple to the red, green and blue physical connections from the access routers. The distribution router may then forward the red, green and blue source information to the core router on three separate physical connections or on a single physical connection using logical designators.

Case 4: Core Router→Distribution Router→Access Router→Red Source and a Receiver

In this case, the core router will use the N+1 IGP instance to merge the "N" instances of the IGP running in the ring networks. Both Distribution and Access routers will be running a single instance of IGP, which will have reachability information to all the other sources in the network. The receiver attached to the access router can reach any source in the network. Also, other receivers in the network can come to this particular source (attached to this access router) using the colored ring based on the color assigned to this particular source.

Once all of the information regarding source mapping (e.g. direct connect to which router and mapped to either red, green or blue ring network) has been shared among all of the core routers (confined within the associated IGP instance) and any distribution and access routers, the routers construct their IGP tables specifying the source destination, next-hop interface and next hop. The core routers construct an IGP table for each instance and then merge the tables to form a comprehensive IGP table for that node. The routers construct these IGP tables in such a manner that the path from any requesting receiver to any destination source is the shortest path given the constraint of the deterministic mapping of red sources to the red ring network, blue sources to the blue ring network and green sources to the green source network. If the ring networks are identical, then the constructed paths are the shortest. If the ring networks have different capacity it is possible that individual paths are not optimal. The core routers suitably construct IGP tables for each of the red, green and blue ring networks and then merge them into a single comprehensive table. The distribution and access routers between the receivers and the core routers (outside the ring) run a single instance of IGP and see the multi-ring network as a virtual single-ring network. Accordingly they each construct a single IGP table that specifies the source destination and next hop, the colored ring networks are not visible to these routers outside the ring.

An embodiment of an IGP table 38 for core router R3 is shown in FIG. 5. IGP table 38 includes sub-tables 40, 42 and 44 for the red, green and blue ring networks, respectively, and a comprehensive sub-table 46 that merges the red, green and blue sub-tables. The exact composition of IGP table 38 is application specific and depends on how the core router is configured. The table could include only the comprehensive sub-table 46 or only the red, green and blue sub-tables. When a node receives either an IGMP join or PIM join for a source destination, the router looks up the next-hop interface and next-hop that are specified in the IGP table and forwards the PIM join to the next node.

Figure 6A:
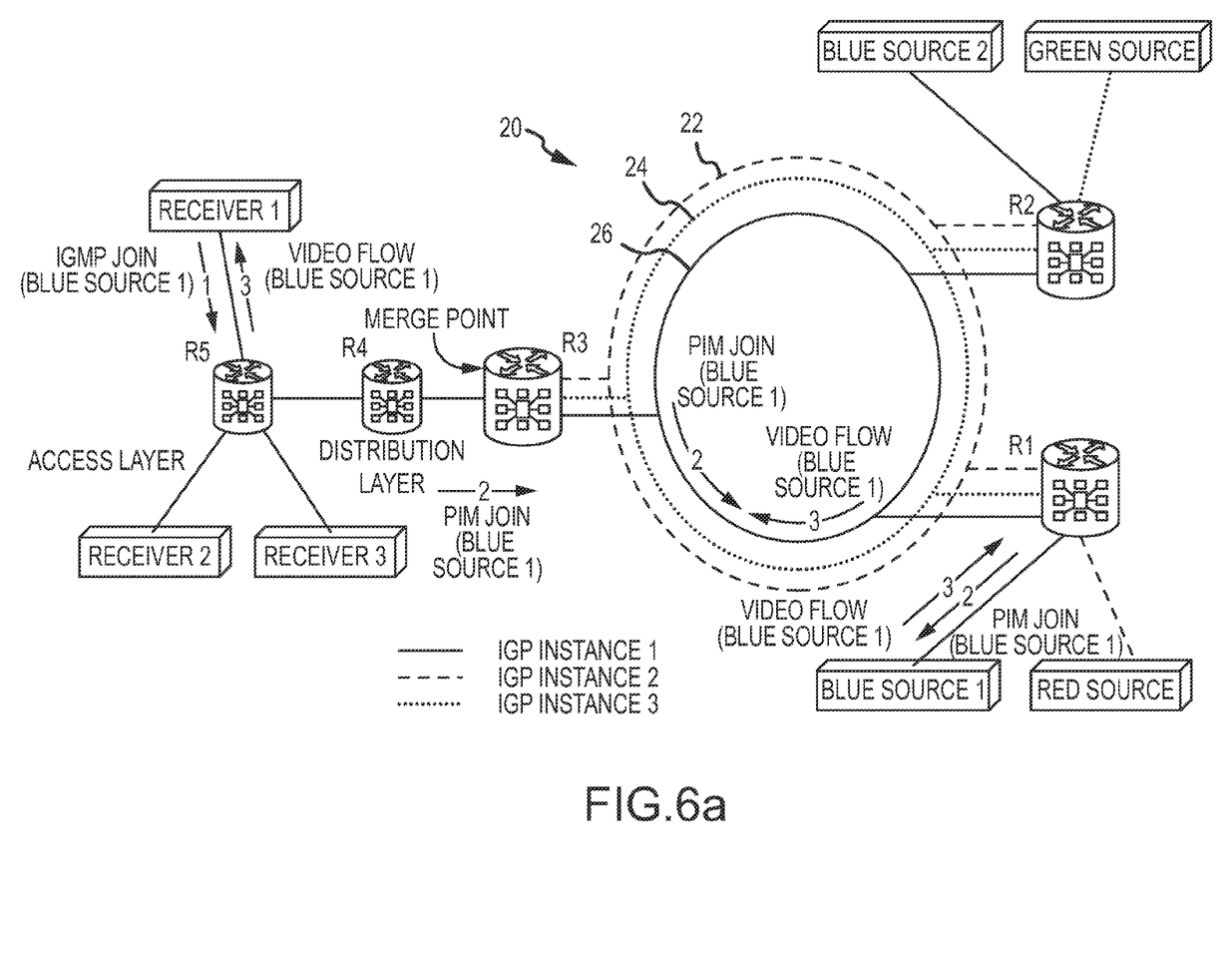
FIGS. 6a through 6c illustrate a multi-ring network and flow diagram for implementing a specific IGMP join, in accordance with one or more embodiments of the present invention.
Figure 6B:
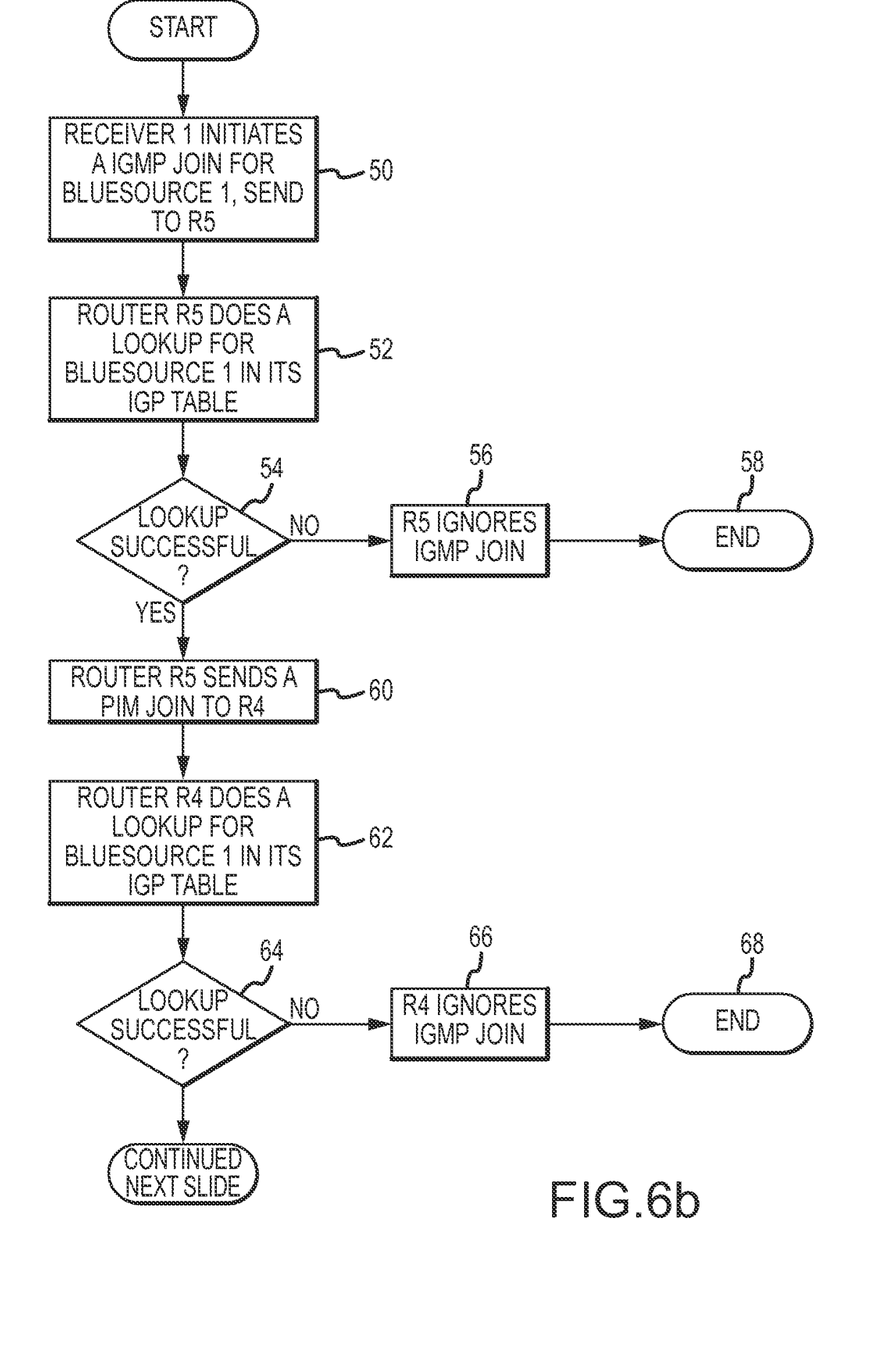
Figure 6C:
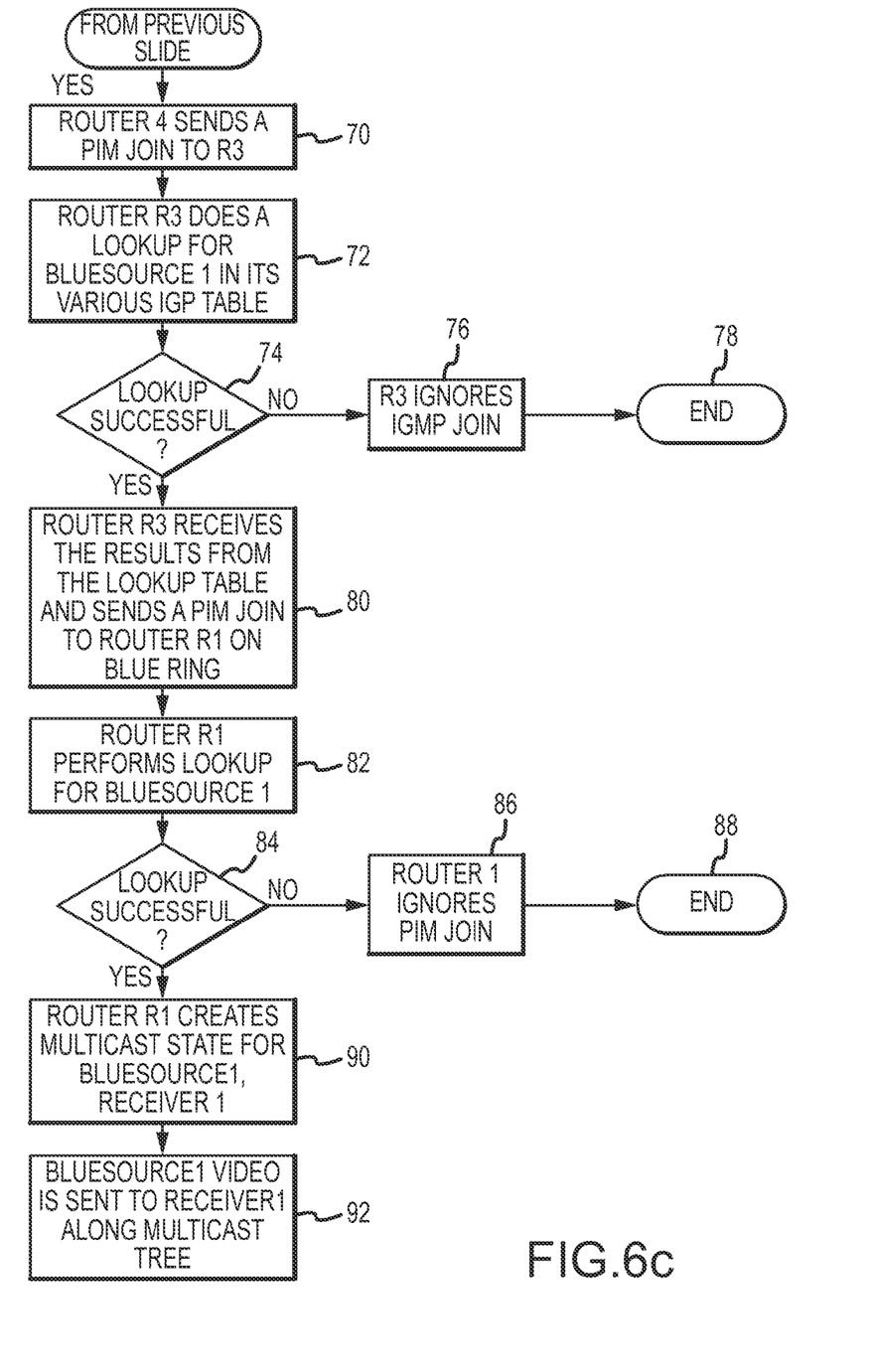

An example of an IGMP join request issued by Receiver 1 for Blue Source 1 is illustrated in FIGS. 6a through 6c as follows:

1) Receiver 1 is initiated and pre-programmed to receive video content from Blue Source 1. Receiver 1 initiates an IGMP join for Blue Source 1 and sends to access router R5 (step 50).

2) Access router R5 on receiving an IGMP join performs a lookup for Blue Source 1 in its IGP table (step 52). If the lookup is unsuccessful (step 54), router R5 ignores the IGMP join (step 56) and ends (step 58).

3) If successful, router R5 receives the results from the IGP table and sends a PIM join to distribution router R4 (step 60).

4) Distribution router R4 on receiving the PIM join performs a lookup for Blue Source 1 in its IGP table (step 62). If the lookup is unsuccessful (step 64), router R4 ignores the PIM join (step 66) and ends (step 68).

5) If successful, router R4 receives the results from the IGP table and sends a PIM join to core router R3 (step 70).

6) Core router R3, on receiving the PIM join, looks up in its various IGP sub-tables (one for each instance of IGP) or its comprehensive table to see the best path to reach the Blue Source 1 (step 72). Since Blue Source1 is part of the Blue IGP Instance 1, the result of the lookup is the blue ring that tells R3 that the best and the only path to reach Blue Source 1 is the blue ring. If the lookup is unsuccessful (step 74), router R4 ignores the PIM join (step 76) and ends (step 78).

7) If successful, core router R3 initiates a PIM join and sends it to R1 on the blue ring network (step 80) (The decision to send this join clockwise or anti-clockwise is done internally within R3).

8) Core router R1, on receiving this PIM join from R3, does a similar lookup in its IGP tables (step 82). If the lookup is unsuccessful (step 84), router R4 ignores the PIM join (step 86) and ends (step 88).

9) If successful, core router R1 determines that Blue Source 1 is directly attached so router R1 simply creates a multicast state in its database (step 90). At this point, the video path (IP multicast distribution tree) has been created.

10) Once Blue Source 1 starts to send out the video content (step 92), the video content will ride the same path as the one built in steps (1) through (9).

Additional IGMP join requests initiated by other receivers in the network for Blue Source 1 traverse the network in a similar manner back to Bluesource 1. These requests will merge with the IP multicast distribution tree creating additional branches where the paths diverge.

Once the IGP tables are constructed, the network operates and behaves in the same manner it would if a single IGP instance was implemented over all of the ring networks. The difference is that by using a combination of autonomous IGP instances on the different ring networks that enforce service separation and a merge IGP instance that merges these autonomous IGP instances at common points (the nodes) so that multi-ring network appears as a single ring network, we can allocate and more efficiently utilize the combined capacity of the individual networks and can contain failures within a given ring network. For example, if the red ring network fails for some reason, the core routers cannot reconfigure themselves to migrate the red traffic to either the green or blue networks. This prevents those networks from becoming overwhelmed and failing.

Figure 7:
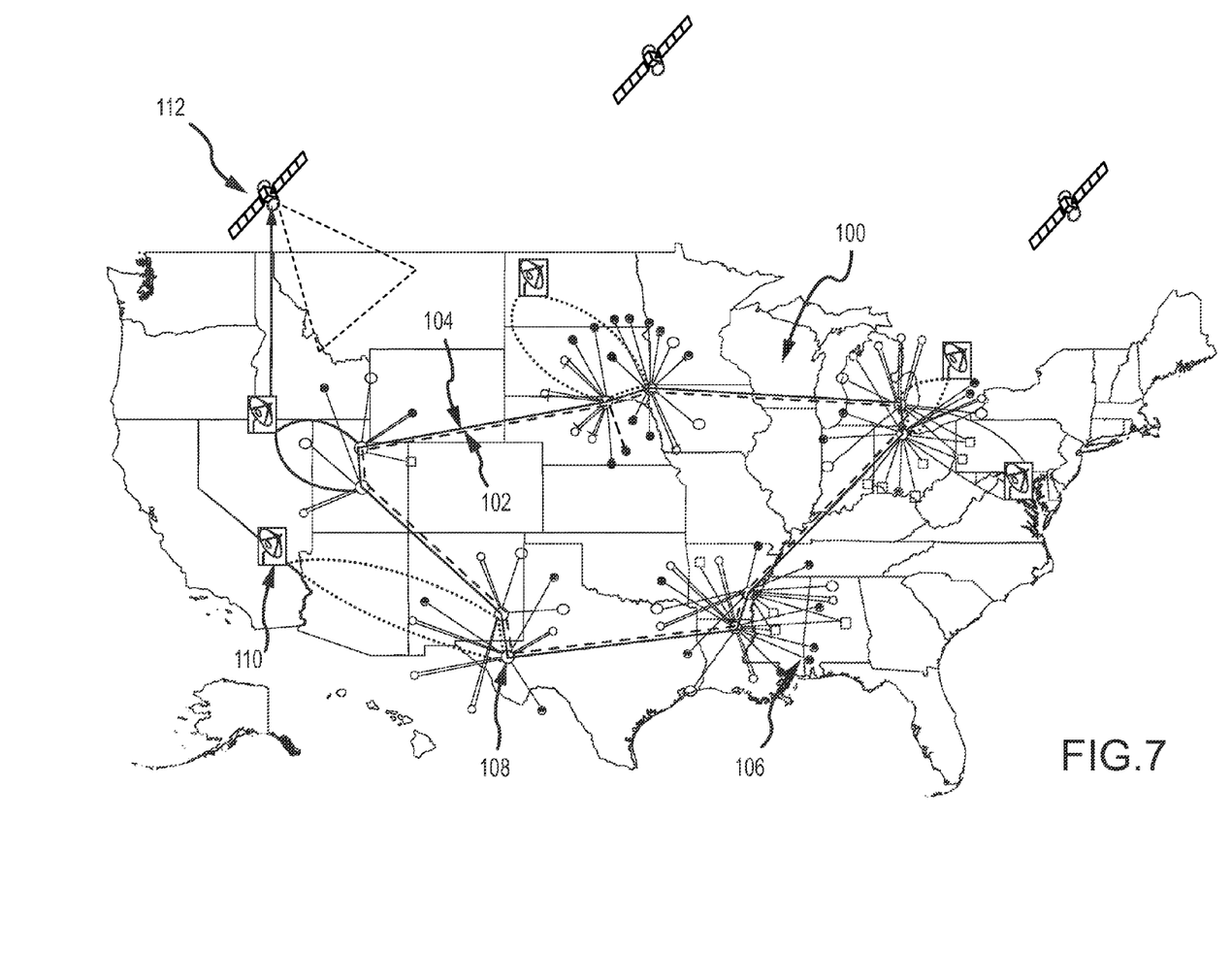
FIG. 7 is an illustration of a multi-ring IP multicast network for carrying video traffic from local collection facilities (sources) to satellite broadcast centers (receivers), in accordance with one or more embodiments of the present invention.

FIG. 7 is a diagram of an IP multi-cast dual-ring network 100 including autonomous 10 GB ring networks 102 and 104 that distribute video content 24/7 from local collection facilities 106 (sources), via ten nodes 108 (e.g. points of presence (PoP)) distributed across the United States, to five satellite broadcast centers 110 (receivers) in the United States, e.g., to uplink video content to a network of satellites 112 for broadcast. Each local collection facility may provide both standard definition (SD) and high definition (HD) content. Typically, a pair of core routers is provided at each node for redundancy. The ring may comprise Cisco Systems CRS-1 routers. The modules on the CRS-1 router that form the ring may be OC-192 SPA, SIP-800 and MSC. The IGP (suitably ISIS) is a software module running on the CRS-1 routers. Receivers are available from multiple vendors such as Tandberg, Sencore etc. although the network is generally applicable for all receiver types that support multicast. The use of autonomous IGP instances on ring networks 102 and 104 and a merge IGP instance effectively doubles the capacity of the network.

The techniques described herein may be applied to various multi-ring configurations. For example, the ring networks associated with the autonomous IGP instances (i.e., the "N" instances) may themselves be formed of any number of rings (e.g., the "blue" IGP instance may correspond to a single-ring network, while the "red" IGP instance may correspond to a two- or three-ring network) and have varying bandwidth capacity. Also, more than one merging IGP instance may be implemented, with each merging IGP instance merging different subsets of the "N" constituent ring networks. Those different subsets of constituent networks may vary in number of constituents and may or may not include common constituent networks (e.g., two merging IGP instances may have overlapping network footprints).

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A system for distribution of data, comprising:
a first bi-directional network having a plurality of nodes;
a second bi-directional network having the same plurality of nodes;
each of said nodes comprising a respective core router coupled to said first network and said second network;
each of said core routers comprising a first routing table corresponding to said first network,
a second routing table corresponding to said second network, and
a merged routing table comprising merged routing information from the first routing table and the second routing table,
wherein each of said core routers is configured to provide autonomous routing services within said first network and said second network respectively using said first routing table and said second routing table;
one or more sources coupled to one or more of said plurality of core routers, wherein each of said one or more sources is registered in only one of said first routing table and said second routing table;
wherein, at each said node, said first routing table lists its sources and a next node interface and a next node on the first network for each listed source;
wherein, at each said node, said second routing table lists its sources and a next node interface and a next node on the second network for each listed source;
wherein, at each said node, said merged routing table lists all the sources and a next node interface and a next node on the first network or second network for each listed source;
a plurality of receivers coupled to said plurality of core routers, wherein each of said core routers is configured to use said merged routing table to enable routing between any one of said plurality of receivers and any one of said one or more sources; and
wherein said first bi-directional network and said second bi-directional network comprise different bi-directional ring networks, each said bi-directional ring network including a clockwise and counterclockwise ring.

2. The system of claim 1, wherein said core routers each comprise:
a first instance of a routing protocol for autonomously servicing said first network;
a second instance of said routing protocol for autonomously servicing said second network; and
a third instance of said routing protocol that uses said merged routing table to service external links to said core router.

3. The system of claim 2, wherein said routing protocol is an interior gateway protocol (IGP).

4. An IP multicast ring network for distribution of data, comprising:
a plurality of geographically diverse nodes;
a plurality "N" ring networks, each network connecting the same plurality of nodes, each ring network including a clockwise ring and a counterclockwise ring, within each said ring each node connects to exactly two other nodes forming a single continuous path for data traffic;
a plurality of sources;
a plurality of receivers;
a plurality of core routers connected at respective nodes to each of the "N" ring networks, each said core router connected to at least one of the source or one of the receivers, said core routers configured to implement IP multicasting for one source to multiple receiver communication over the network in which IP multicast join requests from the receivers to an IP multicast group address constructs a IP multicast distribution tree for that group as each join request traverses the nodes in the network according to IGP tables at each node to the source, the source broadcasts data traffic that traverses the network according to the IP multicast distribution tree with the routers replicating the data traffic as needed to reach the requesting receivers;
"N" instances of an Internet Gateway Protocol (IGP) implemented by the core routers, each said IGP instance autonomously configured on a different ring network to provide autonomous routing services within each said ring network and service separation between the ring networks, each said IGP instance announcing the one or more sources that are mapped on the associated ring network, each said source announced in one and only one IGP instance so that the source is mapped on one and only one ring network with at least one source mapped to each said IGP instance and ring network, said core routers configured to share the "N" IGP instances to build the IGP table at each node that maps each source destination to its associated ring network and a next node to send the join request; and
an "N+1" instance of the IGP implemented by core routers connected to a receiver that merges and redistributes the "N" instances of the IGP towards the receivers so that distribution or access routers between the core router and the receiver can build their IGP tables with a single IGP instance allowing each of the receivers to access any source connected to the network.

5. The network of claim 4, wherein at least two of the "N" ring networks have different bandwidth.

6. The network of claim 4, wherein the "N" ring networks have the same bandwidth.

7. The network of claim 4, wherein the IGP instance has no awareness of utilized bandwidth within its ring network or any of the other ring networks.

8. The network of claim 4, wherein said autonomous IGP instances provide failure containment of a ring network within that network by preventing migration of data traffic from the failed ring network to other ring networks.

9. The network of claim 4, wherein the shared source information is confined to each IGP instance, each said core router first builds an IGP table for each instance and then merges those IGP tables to form a comprehensive IGP table.

10. The network of claim 4, further comprising:
one or more distribution and access routers connected between at least one said core router and at least one said receiver, said distribution and access routers implemented with a single IGP instance having reachability information to all the other sources in the network.

11. The network of claim 4, further comprising:
one or more distribution and access routers connected between at least one said core router and at least one said source, said distribution and access routers implemented with the IGP instance on which said source is mapped.

12. The network of claim 4, wherein said sources are located at local collection facilities and said receivers are located at satellite broadcast centers, further comprising:
- satellite uplinks at the satellite broadcast centers that uplink the data traffic; and
- a network of satellites that broadcast the data traffic.

13. An IP multicast ring network for distribution of data, comprising:
- a plurality of geographically diverse nodes;
- a plurality "N" optical fiber rings that connect the same nodes into N physically separate bi-directional ring networks;
- a plurality of core routers connected at respective nodes to each of the "N" ring networks;
- "N" instances of an Internet Gateway Protocol (IGP) implemented by the core routers, each said IGP instance autonomously configured on a different ring network to provide autonomous routing services within each said ring networks and service separation between ring networks,
- each said IGP instance announcing one or more sources that are mapped on the associated ring network, each said source announced in one and only one IGP instance so that the source is mapped on one and only one ring network with at least one source mapped to each said IGP instance and ring network; and
- an "N+1" instance of the IGP implemented by core routers connected to a receiver that merges and redistributes the "N" instances of the IGP towards the receivers allowing each of the receivers to access any source connected to the network;
- wherein said "N" IGP instances contain a failure of a ring network within that network by preventing migration of data traffic from the failed ring network to other ring networks.

14. The network of claim 13, wherein the "N" IGP instances have no awareness of utilized bandwidth of their assigned ring network or any of the other ring networks, said "N" IGP instances enforcing service separation between the ring networks to utilize bandwidth in accordance with the mapping of the sources to the different networks.

15. The network of claim 13, further comprising:
- one or more distribution and access routers connected between at least one said core router and at least one receiver, said distribution and access routers implemented with a single IGP instance having reachability information to all the other sources in the network; and
- one or more distribution and access routers connected between at least one said core router and at least one source, said distribution and access routers implemented with the IGP instance on which said source is mapped.

16. A method of data distribution in an IP multicast ring network, comprising:
- connecting a plurality of geographically diverse nodes into a plurality "N" bi-directional ring networks;
- connecting a plurality of core routers at respective nodes to each of the N ring networks;
- mapping each of a plurality of sources to one and only one of the N ring networks;
- implementing "N" instances of an Internet Gateway Protocol (IGP) on the core routers, each said IGP instance autonomously configured on a different ring network to provide autonomous routing services within each said bi-directional network and service separation between ring networks, each said IGP instance announcing one or more of the sources that are mapped on the associated ring network, each said source announced in one and only one IGP instance so that the source is mapped on one and only one ring network;
- implementing an "N+1" instance of the IGP on core routers connected to a receiver that merges and redistributes the "N" instances of the IGP towards the receivers allowing each of the receivers to access any source connected to the network;
- implementing a single IGP instance having reachability information to all the other sources in the network on one or more distribution and access routers connected between at least one said core router and at least one receiver; and
- implementing the IGP on which a source is mapped on one or more distribution and access routers connected between at least one said core router and the source.

17. The method of claim 16, further comprising:
- sharing source information confined to each IGP instance among the core routers;
- at each core router, building an IGP table for each instance; and
- at each core router, merging the IGP tables for the instances into a comprehensive IGP table.

18. The method of claim 16, wherein the "N" IGP instances have no awareness of utilized bandwidth of their assigned ring network or any of the other ring networks, further comprising:
- using the "N" IGP instances to enforce service separation between the ring networks to utilize bandwidth in accordance with the mapping of the sources to the different networks.

19. The method of claim 16, further comprising:
- using the "N" IGP instances to contain a failure of a ring network within that network by preventing migration or oversubscription of data traffic from the failed ring network to other ring networks.

20. The method of claim 16, wherein said sources are located at local collection facilities and said receivers are located at satellite broadcast centers, further comprising:
- uplinking the data traffic from the broadcast centers to a network of satellites; and
- broadcasting the data traffic from the network of satellites.

21. A method of increasing capacity of an IP multicast ring network in which optical fiber connects a plurality of core routers at geographically diverse nodes into a first bi-directional ring network running a first instance of an Internet Gateway Protocol (IGP), comprising:
- installing optical fibers that connect the same plurality of core routers at the same geographically diverse nodes to form a second bi-directional ring network;
- mapping each of a plurality of sources to one and only one of the first or second ring networks;
- implementing a second instance of IGP on the core routers, said first and second IGP instances autonomously configured on said first and second bi-directional ring networks to provide service separation between ring networks, each said IGP instance announcing one or more of the sources that are mapped on the associated ring network, each said source announced in one and only one IGP instance so that the source is mapped on one and only one ring network; and
- implementing third instance of the IGP on core routers connected to a receiver that merges and redistributes the first and second instances of the IGP towards the receivers allowing each of the receivers to access any source connected to the network;
- implementing a single IGP instance having reachability information to all the other sources in the network on one or more distribution and access routers connected between at least one said core router and at least one receiver; and implementing the IGP on which a source is mapped on one or more distribution and access routers connected between at least one said core router and the source.

* * * * *